United States Patent [19]

Lane et al.

[11] Patent Number: 4,517,855

[45] Date of Patent: May 21, 1985

[54] POWER TAKE-OFF LEVER ARRANGEMENT FOR A TRACTOR

[75] Inventors: Lloyd L. Lane; Gregory S. Hosford, both of Waterloo, Iowa

[73] Assignee: Deere & Company, Moline, Ill.

[21] Appl. No.: 397,636

[22] Filed: Jul. 12, 1982

[51] Int. Cl.[3] .......................... G05G 5/08; F16B 3/00

[52] U.S. Cl. ........................................ 74/528; 74/531; 74/475; 403/356

[58] Field of Search ................. 74/528, 523, 476, 531, 74/529, 730, 501.5, 527, 475; 403/356, 355, 93, 96

[56] References Cited

U.S. PATENT DOCUMENTS

| | | | |
|---|---|---|---|
| 950,290 | 2/1910 | Hughes | 403/356 |
| 2,896,315 | 7/1959 | Dubberke | 403/356 |
| 3,786,690 | 1/1974 | Bruhn | 74/476 |
| 3,789,694 | 2/1974 | Haupt | 74/531 |
| 4,400,995 | 8/1983 | Palm | 74/476 |

FOREIGN PATENT DOCUMENTS

| | | | |
|---|---|---|---|
| 1472405 | 2/1969 | Fed. Rep. of Germany | 74/527 |
| 2079387 | 1/1982 | United Kingdom | 74/527 |

*Primary Examiner*—Kenneth J. Dorner

*Assistant Examiner*—Vinh Luong

[57] ABSTRACT

An improved power take-off lever arrangement for a tractor is disclosed which prevents the inadvertent shifting of the PTO lever from a first to a second position. The lever arrangement includes a support plate secured to the tractor and has a pin extending outward therefrom which engages an oval aperture formed in a manually operated lever. The lever is connected to a control valve for hydraulically engaging a power take-off drive. The control valve is responsive to move to a second position with corresponding movement of the lever and is spring biased to move to a first position with corresponding movement of the lever when the hydraulic pressure falls below a predetermined value. The lever is also spring biased to the first position such that an attachment mechanism formed on both the lever and the pin engages. The improvement includes a keyway formed in the periphery of the pin which is aligned parallel to the central axis of the pin and a key formed on the inner circumference of the aperture in the lever. The key is aligned with and engages the keyway when the lever is in the first position and is out of alignment with the keyway but is in contact with the periphery of the pin when the lever is in the second position.

6 Claims, 2 Drawing Figures

POWER TAKE-OFF LEVER ARRANGEMENT FOR A TRACTOR

Field of the Invention

This invention relates to an improved power take-off lever arrangement for a tractor which prevents the inadvertent shifting of the PTO lever from a first to a second position.

BACKGROUND OF THE INVENTION

Most agricultural tractors and some industrial tractors are provided with a rear mounted power take-off drive which is used to transmit power to an attached implement. Operation of the power take-off drive is controlled by a lever normally mounted on the left-hand side of the steering column. This lever, which extends through the dashboard, is susceptible to being bumped or knocked as the driver enters or exits the tractor cab. The possibility of inadvertently engaging the power take-off (PTO) presents a safety risk especially to another person who may be working on an attached implement, which is connected to the PTO drive, in the belief that the PTO is disengaged.

One method for preventing such engagement is described in U.S. Ser. No. 397,637, filed on July 12, 1982, wherein a roller, which is attached to the lever, is capable of engaging in a recess formed on an arcuate sector which is fixed to a pin. The lever is spring biased to a position such that the roller will engage the recess when the lever is in the disengaged position. Although such a lever has proved to be very successful in overcoming the inadvertent shifting problem, it has been noticed that on rare occasions, the lever is still capable of moving to the engaged position should the roller roll out of the recess. Other disadvantages of the pin lever arrangement are that it is complicated in structure and is rather costly to manufacture and assemble.

SUMMARY OF THE INVENTION

Briefly, this invention relates to an improved power take-off lever arrangement for a tractor which has a support plate secured to the tractor and has a pin extending outward therefrom. The pin engages with an oval aperture formed in a manually operated lever. The lever is connected to a control valve for hydraulically engaging a power take-off drive. The control valve is spring biased to move to a first (disengaged) position with corresponding movement of the lever when the hydraulic pressure falls below a predetermined value, and is responsive to move to a second (engaged) position with corresponding movement of the lever. The lever is further spring biased to a first position such that an attachment mechanism formed on both the lever and the pin engages to prevent the inadvertent shifting of the lever. The improvement includes a keyway formed in the periphery of the pin which is aligned parallel to the central axis of the pin and a key formed on the inner circumference of the oval aperture. The key is aligned with and engages the keyway when the lever is in the first position and is out of engagement with the keyway but in contact with the periphery of the pin when the lever is in the second position. Such a lever arrangement makes it virtually impossible for the lever to be inadvertently moved to the second position.

The general object of this invention is to provide an improved power take-off lever arrangement for a tractor which prevents inadvertent shifting of the PTO lever from a first to a second position. A more specific object of this invention is to provide an improved power take-off lever arrangement for a tractor which issimple in construction and economical to build.

Another object of this invention is to provide an improved power take-off lever arrangement for a tractor which has a minimum number of moving parts.

Still another object of this invention is to provide an improved power take-off lever arrangement for a tractor which utilizes a keyway and an engaging key to physically prevent the lever from being inadvertently shifted to the second position.

Other objects and advantages of the present invention will become more apparent to those skilled in the art in view of the following description and the accompanying drawings.

DETAILED DESCRIPTION OF THE PREFERRED EMBODIMENT

Figure 1:
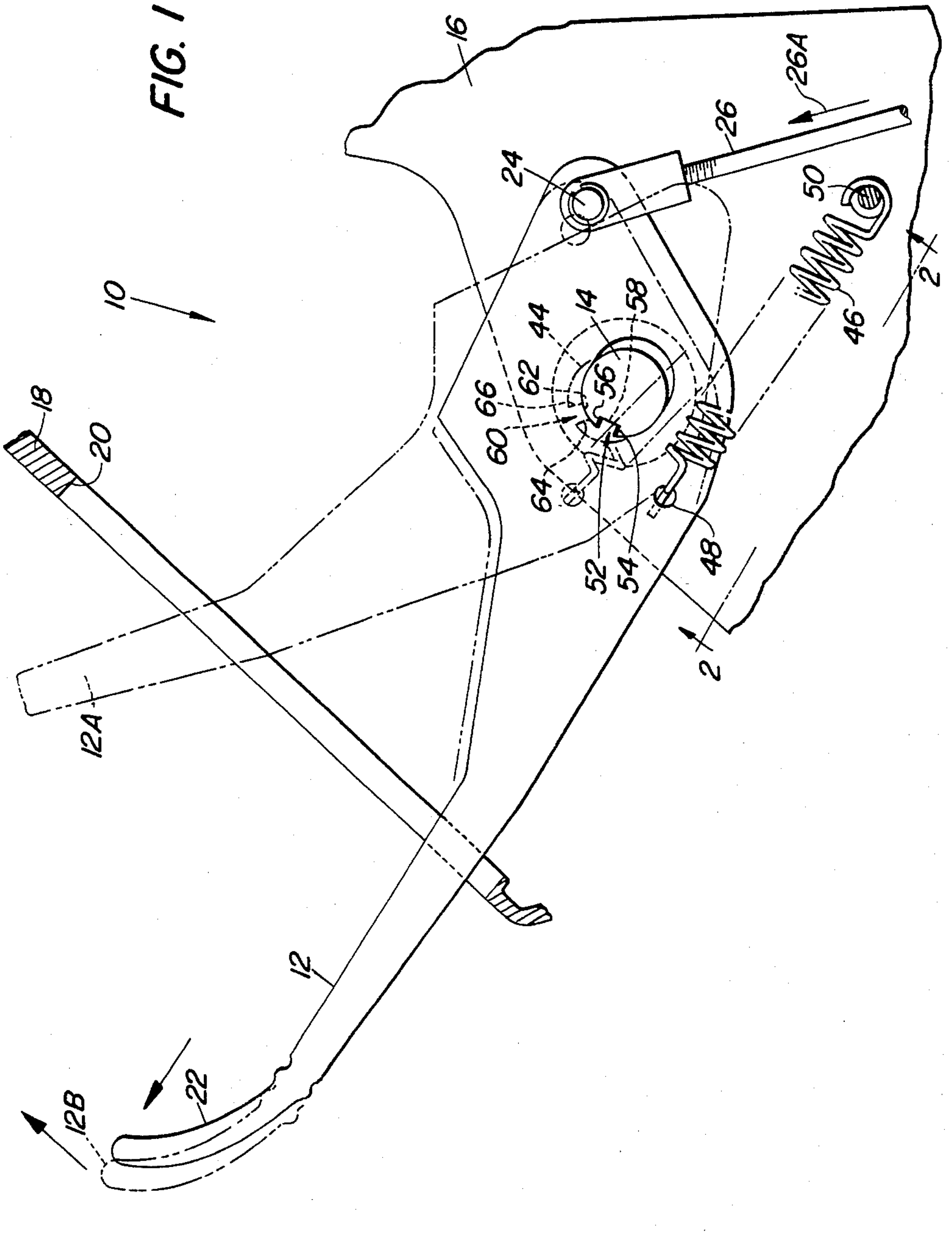
FIG. 1 is a side elevation view of the improved power take-off lever arrangement.

Referring to the drawings, an improved power take-off lever arrangement 10 is shown having a lever 12 which is pivotally attached by a pin 14 to a support plate 16. The support plate 16 is attached to the frame of a tractor behind a dashboard 18. The lever 12 projects through a slot 20 formed in the dashboard 18 and has a grip 22 formed on its exposed end for permitting an operator to move the lever 12 between a first position (PTO drive is disengaged) shown in solid lines in FIG. 1, and a second position (PTO drive is engaged) shown at 12A in broken lines. Normally, the PTO shift lever 12 is located just to the left of the steering column of the tractor and is susceptible to being bumped or knocked as the operator enters or exits the tractor cab.

Figure 2:
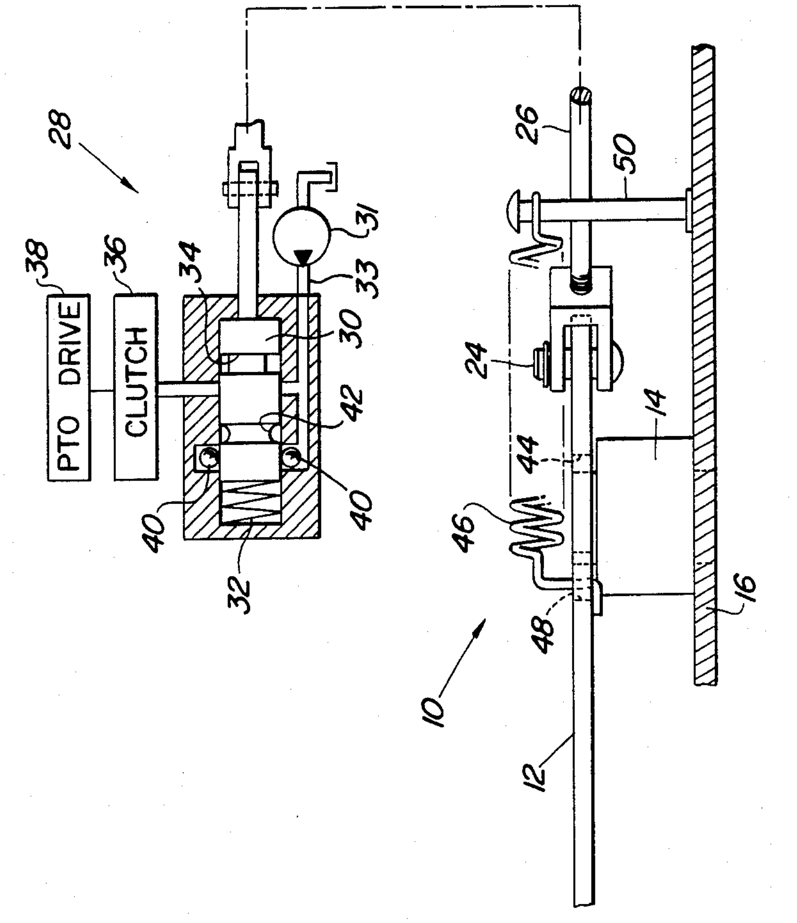
FIG. 2 is a view of the improved PTO lever arrangement from below taken along the line 2—2 of FIG. 1 and including a PTO control valve and drive.

An inner end of the lever 12 is pivotally connected by a stud 24 to a link 26 which is connected to a powertake-off control valve 28, see FIG. 2. The PTO control valve 28 includes a movable spool 30 which is biased by a spring 32 to a first (disengaged) position, indicated by the right most position in FIG. 2. As the movable spool 30 is moved to the left to a second (engaged) position, hydraulic pressure from a supply pump 31 is routed through a line 33 and a groove 34, which is formed in the spool 30, to a hydraulically activated clutch 36. By engaging or disengaging the clutch 36, a power take-off drive 38 can be engaged or disengaged, respectively. When the power take-off drive 38 is engaged, its output shaft rotates and this power can be used to drive an attached implement.

Upon shifting the lever 12 from the first to the second position 12A, the link 26 is moved such that it pushes the spool 30 inward and compresses the spring 32. As this occurs, detent balls 40 positioned about the spool 30 and movable by hydraulic pressure engage in a groove 42 formed in the periphery of the spool 30. The detent balls 40 therefore will hold the spool 30 in the second position until the spool 30 is physically moved back to the right by movement of the lever 12 back to the first position or when the hydraulic line pressure falls below a predetermined value. In the latter situation, the force of the spring 32 will move the spool 30 to the right and cause the detent balls 40 to move out of the groove 42. Such action will cause the link 26 to move outward as indicated by arrow 26A in FIG. 1 and thus pivot the lever 12 back to the first position. Details of a PTO control valve can be found in U.S. Pat. No. 4,296,649 which issued to Marquart in 1981, and which is hereby incorporated by reference and made a part hereof.

The lever 12 is pivotally mounted on the fixed pin 14 by way of an oval aperture 44. The oval aperture 44 permits the lever 12 to move radially in and out relative to the dashboard 18. Besides being able to move in and out relative to the pin 14, the lever 12 is also drawn inward relative to the dashboard 18 by a tension spring 46 which is stretched between an aperture 48 formed in the lever 12 and a pin 50 secured to the support plate 16.

The improved PTO lever arrangement 10 further includes a keyway 52 which is formed in the periphery of the pin 14 such that it is aligned parallel to the central axis of the pin 14. The keyway 52 contains parallelly aligned side surfaces, 54 and 56, which are perpendicularly arranged with a bottom surface 58. The keyway 52 is sized to recieve a key 60 formed on the inner circumferential surface of the oval aperture 44. The key 60 is aligned with an engages the keyway 52 when the lever 12 is in the first position. When the lever 12 is in the second position, the key 60 is in contact with the periphery of the pin 14. Preferably, the key 60 contains a concave surface 62 which is similar to the peripheral arc of the pin 14. These mating surfaces permit a minimum amount of frictional contact to be present between the lever 12 and the pin 14 as the lever 12 is shifted between positions. It should be mentioned that this frictional contact is insufficient to affect the movement of the lever 12 to the first position when the hydraulic pressure indirectly acting on the control valve 28 falls below a predetermined value.

The key 60 also has parallelly arranged side surfaces, 64 and 66, which are aligned parallel to the keyway side sufaces, 54 and 56, when the key 60 engages the keyway 52. This parallel arrangement ensures that the lever 12 cannot be inadvertently shifted to the second position.

In order to move the lever 12 to the second position 12A, it is necessary that the operator first pull the lever 12 outward towards himself and against the force of the spring 46 to a position 12B (indicated by broken lines) before the lever 12 can be shifted over to the second position 12A. When the lever 12 is in the second position 12A, the spring 46 will pull against the lever 12 such that a force is present to urge the key 60 back into the keyway 52. This force created by the spring 46 is small and, although it assists the bias of the spring 32 acting on the spool 30 of the PTO control valve 28, it will not overcome the holding action of the detent balls 40. If desired, the supplementry action of the tension spring 46 can be compensated for by a slight reduction in the strength of the spring 32 located in the PTO control valve 28.

If the hydraulic line pressure should fall below a predetermined value, whereby the detent balls 40 are no longer able to hold the spool 30 of the PTO control valve 28 in the second position, the spring 32 will force the spool 30 and the link 26 to move outward. This action will cause the key 60 to ride along the peripheral surface of the pin 14 as the lever 12 pivots back to the first position. The key 60 will positively snap back into the keyway 52 once the lever 12 reaches the first position due to the force of the spring 46. Likewise, when the lever 12 is pulled back by hand to the first position, the spring 46 will ensure that the key 60 positively snaps back into the keyway 52.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. An improved power take-off lever arrangement for a tractor having a support plate secured to said tractor and having a pin extending outward therefrom which engages an aperture formed in a manually operable lever, said lever being connected to a control valve for hydraulically engaging a power take-off drive, said control valve being responsive to move to a second position with corresponding movement of said lever and being spring biased to move to a first position with corresponding movement of said lever when said hydraulic pressure falls below a predetermined value, said lever further being spring biased to said first position such that an attachment mechanism formed on both said lever and said pin engages, said improvement comprising:
   (a) a keyway formed in the periphery of said pin which is aligned parallel to the central axis of said pin; and
   (b) a key formed on the inner circumference of said aperture which is formed in said lever, said key being aligned with and engaging said keyway when said lever is in said first position and being out of engagement with said keyway but in contact with the periphery of said pin when said lever is in said second position.

2. The improved power take-off lever arrangement of claim 1 wherein said key has a concave outer surface which is mateable with the outer periphery of said pin.

3. The improved power take-off lever arrangement of claim 2 wherein said key and keyway have parallelly aligned side surfaces.

4. The improved power take-off lever arrangement of claim 2 wherein said key is in frictional engagement with the periphery of said pin when said lever is in said second position.

5. The improved power take-off lever arrangement of claim 1 wherein said keyway contains parallelly aligned side surfaces which are perpendiculary arranged with a bottom surface of said keyway.

6. The improved power take-off lever arrangement of claim 1 wherein said aperture formed in said lever has an oval configuration.

* * * * *